(12) United States Patent
Fernandes et al.

(10) Patent No.: US 11,711,315 B1
(45) Date of Patent: Jul. 25, 2023

(54) DYNAMIC ENDPOINT RESOURCES DISCOVERY IN KUBERNETES CLUSTERS VIA STABLE URI LOCATOR FOR WORKFLOW SERVICES

(71) Applicant: Red Hat, Inc., Raleigh, NC (US)

(72) Inventors: Ricardo Zanini Fernandes, Sao Paulo (BR); Edoardo Vacchi, Milan (IT)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/664,692

(22) Filed: May 24, 2022

(51) Int. Cl.
*H04L 47/80* (2022.01)
*H04L 67/147* (2022.01)
*H04L 47/78* (2022.01)
*H04L 47/70* (2022.01)

(52) U.S. Cl.
CPC .......... *H04L 47/803* (2013.01); *H04L 47/781* (2013.01); *H04L 47/822* (2013.01); *H04L 67/147* (2013.01)

(58) Field of Classification Search
CPC ... H04L 47/781; H04L 47/803; H04L 47/822; H04L 67/142
See application file for complete search history.

(56) References Cited

U.S. PATENT DOCUMENTS

| | | | |
|---|---|---|---|
| 10,225,335 B2 | 3/2019 | Fu et al. | |
| 10,558,457 B1 | 2/2020 | Kolb et al. | |
| 10,944,691 B1 * | 3/2021 | Raut | H04L 45/64 |
| 11,019,023 B1 | 5/2021 | Hegde et al. | |
| 11,411,886 B1 * | 8/2022 | Bhandari | H04L 47/805 |
| 11,429,399 B2 * | 8/2022 | Vigil | G06F 9/5022 |
| 2020/0186422 A1 * | 6/2020 | Fildebrandt | H04L 41/0846 |
| 2020/0403911 A1 | 12/2020 | Singhal et al. | |
| 2022/0012111 A1 | 1/2022 | Caldato et al. | |
| 2022/0391239 A1 * | 12/2022 | Feldman | G06F 11/3664 |

OTHER PUBLICATIONS

U.S. Appl. No. 17/556,453, filed Dec. 20, 2021.
GitHub API Conventions, webpage accessed at https://github.com/kubernetes/community/blob/master/contributors/level/sig-architecture/api-conventions.md#object-references.
Kubernetes Object Names and IDs, webpage accessed at https://kubernetes.io/docs/concepts/overview/working-with-objects/names/.

(Continued)

*Primary Examiner* — George C Neurauter, Jr.
(74) *Attorney, Agent, or Firm* — Womble Bond Dickinson (US) LLP

(57) ABSTRACT

A method of performing resource discovery includes receiving, by a processing device, a resource identifier describing a resource of a computing cluster to be accessed by a workflow application. The method also includes sending the resource identifier to a container orchestration API to determine whether an endpoint exists for the resource. The method also includes, in response to an indication from the container orchestration API that the endpoint exists, receiving, from the container orchestration API, endpoint details used to access the resource, identifying an endpoint address based on the endpoint details, and binding the endpoint address to the resource in a runtime version of the workflow application to enable the workflow application to access the resource.

20 Claims, 7 Drawing Sheets

(56) References Cited

OTHER PUBLICATIONS

DataTracker, Guidelines for new URL Schemes, RFC 2718, webpage accessed at https://datatracker.ietf.org/doc/html/rfc2718.
Kubernetes Service, webpage accessed at https://kubemetes.io/docs/concepts/services-networking/service/#discovering-services.
Services, Load Balancing, and Networking, webpage accessed at https://kubernetes.io/docs/concepts/services-networking/_print/, 2022.
Getting Started with Kubernetes | Service Discovery and Load Balancing in Kubernetes, Wang Bingshen, webpage accessed at https://www.alibabacloud.com/blog/getting-started-with-kubernetes-%7C-service-discovery-and-load-balancing-in-kubernetes_596289, Jun. 12, 2020.
Kubernetes Services, webpage accessed at https://www.aquasec.com/cloud-native-academy/kubernetes-101/kubernetes-services/, 2022.
RFC 3986 Uniform Resource Identifier (URI): Generic Syntax, webpage accessed at https://datatracker.ietf.org/doc/html/rfc3986.

* cited by examiner

DYNAMIC ENDPOINT RESOURCES DISCOVERY IN KUBERNETES CLUSTERS VIA STABLE URI LOCATOR FOR WORKFLOW SERVICES

TECHNICAL FIELD

Aspects of the present disclosure relate to cloud computing systems, and more particularly, to endpoint discovery for dynamic resources in a cloud environment.

BACKGROUND

A container orchestration platform is a platform for developing and running containerized applications and may allow applications and the data centers that support them to expand from just a few machines and applications to thousands of machines that serve millions of clients.c Container orchestration engines may provide an image-based deployment module for creating containers and may store one or more image files for creating container instances. Many application instances can be running in containers on a single host without visibility into each other's processes, files, network, and so on. Each container may provide a single function (often called a "service") or component of an application, such as a web server or a database, though containers can be used for arbitrary workloads. One example of a container orchestration platform is the Red Hat™ OpenShift™ platform built around Kubernetes.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
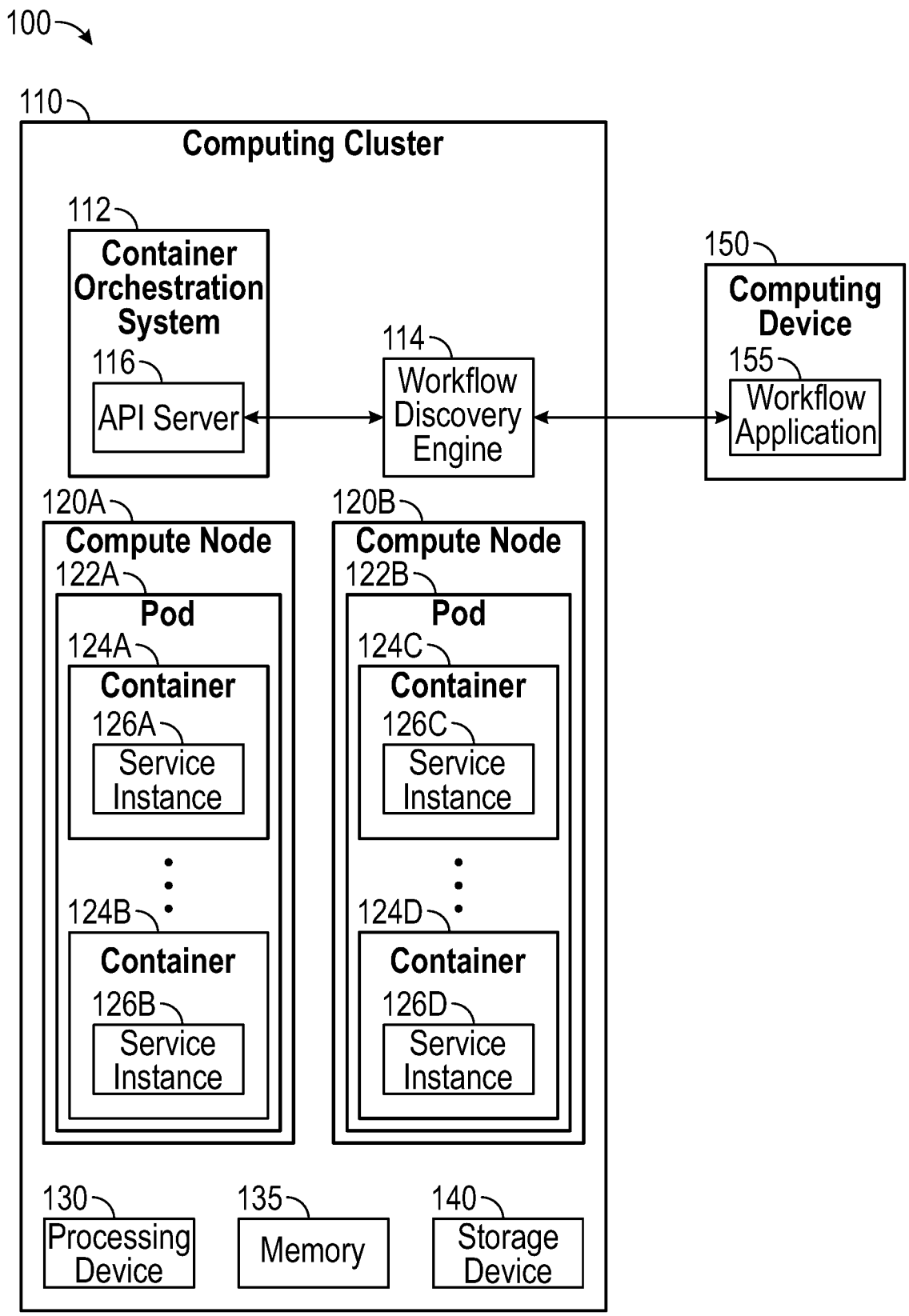
FIG. 1 is a block diagram that illustrates an example computer system architecture, in accordance with some embodiments of the present disclosure.

The present disclosure describes techniques for discovering resource end-points in a cloud computing system, including container orchestration platforms such as Kubernetes. The resource discovery techniques described herein can enable an application deployed to the computing platform to use a uniform and consistent global addressing for workflow applications and the resources used therein.

Cloud-based applications may be deployed as a plurality of services (e.g., micro-services) on one or more of the computing nodes. One type of application that is often used for services orchestration and composition use cases is known as a workflow application. The work flow may be a representation of an end-to-end sequence of activities or tasks within a process. Orchestrating and composing the services and other resources used in the workflow requires endpoint discovery. The endpoint of a resource describes the addressing information used to access the resource. For example, the endpoint can include a port number, an Internet Protocol (IP address), Uniform Resource Locator (URL) of the resource, and other information. In Kubernetes, an endpoint is an addressable object that has IP addresses of individual pods assigned to it, which allows these pods to be accessed through the endpoint.

Service discovery is a common problem in service orchestration and composition with workflow applications. When designing a workflow, users usually don't have access to deployment details of the services that are part of the orchestration or composition. For example, in Kubernetes, deployments can have technical details and internal identifications that cannot be known by end-users without proper access to the cluster, making endpoint discovery difficult or impossible. Such cluster access could be requested from a system administrator. However, access to the cluster to may be limited due to security concerns.

Even if the access is granted to a cluster, users may not have a stable way of identifying the endpoint of a given resource since it can change dynamically. For example, there are many ways of exposing a resource on Kubernetes, such accessing the IP address of a POD directly, using a cluster IP service, or using an HTTP ingress service, for example. Additionally, an internal endpoint for a given Kubernetes resource can change if an administrator decides to move the service to another region or change anything on its structure.

Embodiments of the present techniques address the concerns and others by providing a Uniform Resource Identifier (URI) scheme that uniformly identifies the resources within a computing cluster to enable endpoint discovery for workflows on service orchestration and composition use cases. The cluster can include a workflow discovery engine that is configured to discover the endpoint of a resource given a specific URI scheme identifier. For example, given a URI scheme identifier, the workflow discovery engine can identify a Kubernetes resource type and discover the endpoint. In some embodiments, if the resource cannot be found or doesn't exist, the workflow discovery engine can create a new one. During runtime, this endpoint would be bound to the workflow execution to enable calls to the deployed resources. Having a uniform identification of a Kubernetes resource to discover services would benefit workflow designers that don't necessarily have knowledge of or access to the cluster internals and the deployment infrastructure.

Some container orchestration platforms such as Kubernetes support service discovery via injection of environment variables in the service's containers. This can be useful if the target service is deployed in the same namespace. However, if the service is deployed in a different namespace, it won't be possible to find the target service this way. Also, the user designing the workflow may not preemptively know the values of these variables to bind to the workflow service during the design phase of application development. The Kubernetes API can identify a resource by the resource's name, namespace, group, version, and kind (GVK). However, this is a technique that is used internally and does not leverage a specific URI scheme. Therefore, external systems or users would need to have access the Kubernetes API and knowledge of how the Kubernetes API operates to make discovery possible.

By contrast, URIs are compatible with many technology stacks and have a user friendly format. Using a URI scheme for resource discovery in Kubernetes hides the need for an external system or user to know the internals of the Kubernetes API and the deployment infrastructure. The developer can access and create resources based on resource's GVK information, name, and namespace. This information can be accessed without high-level access privileges. With the URI locator, the workflow discovery engine can create an endpoint URL for the resource so that it is accessible internally and externally of the cluster while avoiding exposing the Kubernetes API to external actors.

Additionally, the URI scheme also makes it easier to design a workflow application without prior knowledge about the cluster infrastructure. Not requiring workflow designers to know about Kubernetes internals to discover or configure services with URLs resolved dynamically can decrease the amount of time spent on configuration and custom workarounds. Not requiring users to have knowledge of the internal Kubernetes API, can also decrease the learning curve for users figuring out how to perform service discovery within Kubernetes clusters.

Furthermore, internal endpoints for a given Kubernetes resource can change if an administrator decides to move the service to another region or change anything on its structure. Normally, this would require the user to rediscover the resource endpoint and reconfigure the workflow. In accordance with the present techniques, the workflow discovery engine can update the endpoint definitions during run time automatically, i.e., without human involvement. Since the resource URI identification does not change, no user involvement is needed to facilitate continued endpoint discovery.

Additionally, a user will often design and run a workflow application locally in their computer before deploying to a test environment and eventually a production environment. Typically, every time the user deploys the application to the new environment, the resource identifiers are changed to new names that are applicable for the new environment. By defining the resource calls using the URI identifier, the resource identifiers can be consistent between the different environments, thereby eliminating the burden of changing the resource identifiers for different deployments. The workflow discovery engine takes care of the endpoint configuration between migrations using the same URI.

FIG. 1 is a block diagram that illustrates an example computer system architecture, in accordance with some embodiments of the present disclosure. Computer system 100 includes computing cluster 110. Computing cluster 110 includes container orchestration system 112 to instantiate and manage containers and container workloads across one or more compute nodes 120A and 120B of the computing cluster 110. Compute nodes 120A and 120B may be physical host machines or virtual machines in communication with one another. For example, compute nodes 120A and 120B may each be a physical host machine. Alternatively, compute nodes 120A and 120B may each be a virtual machine executing on a single host machine or multiple host machines. Although FIG. 1 depicts only two compute nodes 120A and 120B, computing cluster 110 may include any number of compute nodes. Additionally, computing cluster 110 may include both physical host machines and virtual machines.

The computing cluster 110 may include a processing device 130, memory 135, and storage device 140. Memory 135 may include volatile memory devices (e.g., random access memory (RAM)), non-volatile memory devices (e.g., flash memory) and/or other types of memory devices. Storage device 140 may be one or more magnetic hard disk drives, a Peripheral Component Interconnect (PCI) solid state drive, a Redundant Array of Independent Disks (RAID) system, a network attached storage (NAS array, etc. Processing device 130 may include multiple processing devices, storage devices, or devices. Processing device 130 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 130 may also include one or more special-purpose processing devices such as an application specific integrated circuit (ASIC), a field programmable gate array (FPGA), a digital signal processor (DSP), network processor, or the like.

In one example, each compute node 120A and 120B may execute one or more pods (i.e., pod 122A of compute node 120A and pod 122B of compute node 120B). A pod may be a collection of one or more containers configured to execute a workload. For example, pod 122A may include one or more containers 124A-B each containing one or more service instances (i.e., service instances 126A-B). Similarly, pod 122B may include one or more containers 124C-D each container one or more service instances (i.e., service instances 126C-D). The container orchestration system 112 may scale a service in response to workloads by instantiating additional containers with service instances in response to a larger workload of the service.

Each pod 122 may have an IP address that can be addressed by internal processes to enable access the pod and the services executing within the pod. For example, one or more of the service instances 124A-D may be a cluster IP service. The cluster IP service is a micro service that provides a single endpoint for communicating with multiple backend pods. The cluster IP service may have an internally addressable endpoint that is accessible to other services. The cluster IP also knows the IP addresses of the pods assigned to it to that communications targeting those pods can be routed accordingly. Other types of internally addressable services that can have pods assigned to them include the NodePort service and LoadBalancer service.

Some services may also be configured to provide an endpoint that can be accessed externally, i.e., from outside of the computing cluster 110. For example, one or more of the service instances 126A-D may be an ingress service that exposes HTTP and HTTPS routes from outside the computing cluster 110 to services within the computing cluster 110. Traffic routing to the pods is controlled by rules defined on the ingress resource.

The computing cluster may also include a container orchestration system 112, which provides management and orchestration functions for deploying and managing applications and services in system 100. For example, the container orchestration system 112 can build one or more container images for providing functionality of applications and services. The container orchestration system 112 can then create one or more containers to host an application or service, for example, by instructing one or more compute nodes 120A and/or 120B to instantiate one or more containers 124A-D from the container image(s)). The container orchestration system 112 can implement an application programming interface (API) referred to herein as container orchestration API 116 (e.g., a Kubernetes API) to facilitate deployment, scaling, and management of containerized software applications. In some embodiments, users with suitable credendtials may be able to communicate directly with the container orchestration API 116 to facilitate management of the computing cluster 110 and perform endpoint discovery for resources of the computing cluster 110, among other functions.

The computing cluster 110 can also include a workflow discovery engine 114 communicatively coupled to the container orchestration API 116. The workflow discovery engine 114 can receive workflow resource identifiers, and communicate with the container orchestration API 116 to discover the applicable resource endpoint or create the resource if not already instantiated. As shown in FIG. 1, the workflow discovery engine 114 may receive a workflow application 155, which contains the workflow resource identifiers. The workflow application may be received from an external source, shown as computing device 150, which may be a computing device of a user such as a workflow designer.

As described further below, resource identifiers may be in the form of a Uniform Resource Identifier (URI). With the URI the workflow discovery engine 114 can create an endpoint URL for the resource to be accessible internally and externally of the cluster. The workflow discovery engine 114 binds the endpoint URL to the runtime version of the workflow application, so that calls to the resource reference the endpoint URL generated by the workflow discovery engine 114.

Figure 2:
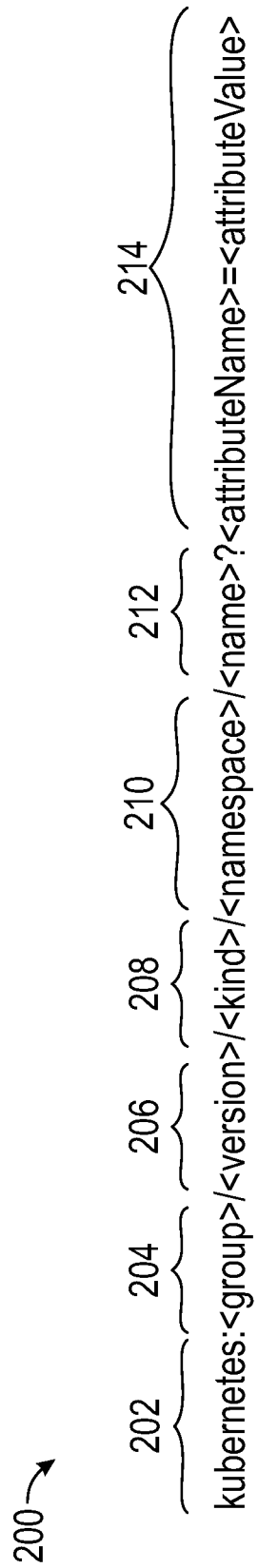
FIG. 2 is an example of a Uniform Resource Identifier (URI) used to identify a resource, in accordance with some embodiments.

FIG. 2 is an example of a Uniform Resource Identifier (URI) used to identify a resource, in accordance with some embodiments. The URI 200 can begin with a scheme name 202 that refers to a specification for assigning identifiers within that scheme. In some embodiments, the scheme name may be "Kubernetes" to identify the URI as conforming to a Kubernetes specification, for example.

The URI 200 also includes a group name 204 that identifies a Kubernetes resource group, a version name 206 that identifies a Kubernetes resource version, and a kind name 208 that identifies a Kubernetes resource kind. The group, version, and kind refer to predefined resources that are defined by the Kubernetes protocol. The kind name 208 refers a type of Kubernetes resource, such as a pod, a deployment, a service, and others. The group name 204 refers to a group, which is a collection of kinds. The version name 206 refers to the group's version.

The name space 210 and name 212 refers to the name and namespace of a particular resource. The name identifies a particular resource object to be instantiated within the computing cluster 100. The namespace provides a scope for the names to allow different users or projects to share a cluster by preventing resources in one namespace from interacting with other namespaces. Names of resources are unique within a namespace but may not be unique across namespaces. The name and namespace may be defined by the developer of the workflow and used to identify a particular resource object.

In some embodiments, the URI 200 can also include an attribute name and attribute value 214, which can be used to give additional context to the discovery process.

As an example, the following shows the YAML representation of a Kubernetes resource:

```
apiVersion: apps/v1
kind: Deployment
metadata:
   name: my-nginx
   namespace: default
spec:
   selector:
      matchLabels:
         run: my-nginx
   replicas: 2
   template:
      metadata:
         labels:
            run: my-nginx
      spec:
         containers:
            name: my-nginx
            image: nginx
            ports:
               containerPort: 80
```

The corresponding URI for identifying this resource would be as follows:

kubernetes:apps/v1/deployment/default/my-nginx

Once this URI is passed to the workflow discovery engine 114, the engine would locate the "my-nginx" deployment resource. From there, it would create an endpoint URL for other services to access it.

Figure 3:
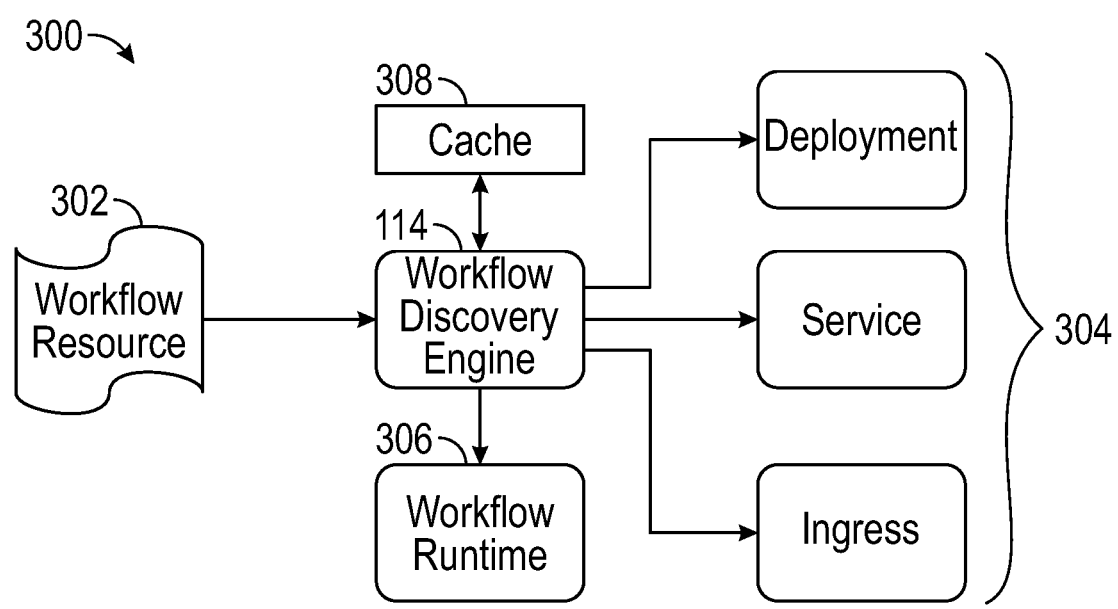
FIG. 3 is a block diagram of an endpoint discovery system, in accordance with some embodiments.

FIG. 3 is a block diagram of an endpoint discovery system, in accordance with some embodiments. The endpoint discovery system 300 may be deployed in a computing cluster such as the computing cluster 110 of FIG. 1. The endpoint discovery system 300 includes the workflow discovery engine 114, which can receive a definition of workflow resource identifier 302. The workflow resource identifier 302 may be generated by a user such as a workflow developer and may be one of several resource identifiers included in a workflow application 155. The workflow resource identifier 302 may be in the form of a URI, such as the URI shown in FIG. 2.

Upon receiving the workflow resource identifier 302, the workflow discovery engine 114 identifies a corresponding resource object 304, which may be a deployment, a service, and ingress, or others. The deployment resource is a Kubernetes object that is used to create a pod or a replica set of two or more pods. The service resource may be any suitable type of service including microservices, such as Kubernetes microservices, or custom services defined by the user or other developers. The ingress resource may be a service that provides an externally accessible endpoint that can be addressed from outside of the computing cluster 100. The resource objects are computing processes executing on a machine, such as the computing cluster 110 of FIG. 1. For example, the resource objects 304 may be one of the service instances 126A-D running in the containers 124A-D.

The resource objects referenced by the workflow resource identifier 302 may be instantiated prior to receiving the workflow resource, in which case the workflow discovery engine can locate the resource object through the container orchestration API 116 of the container orchestration system 112. Locating the resource object means identifying the endpoint information to be used to communicate with the resource, such as an IP address, port number, or URL, for example.

In some cases, the resource object 304 referenced by the workflow resource identifier 302 may not be instantiated prior to receiving the workflow resource identifier, in which case the workflow discovery engine 114 may not be able to discover an endpoint for the resource object 304. In some embodiments, if the endpoint of the resource object 304 is not discoverable, the resource object 304 can be created by the workflow discovery engine 114.

Once the resource object endpoint 304 has been discovered or created, the resource's endpoint is bound to the workflow runtime, which means that the resource's endpoint information (e.g., IP address, URL, etc.) is associated with the URI and invoked each time a call is made to the resource using the URI.

In some embodiments, the resource's endpoint information can be updated if it changes. For example, if a system administrator relocates a resource (e.g., to new compute node, or a region with a different Domain Name Service (DNS)) the above discovery process can be repeated so that the URI is bound to the new endpoint information.

Additionally, the discovery process would also be repeated each time the workflow application is redeployed. In this way, the identifying information used to name resources within a workflow application 155 can remain consistent across different deployments even though the endpoints for some or all of the resources may be different.

In some embodiments, the workflow discovery engine 114 maintains a cache 308, to store the endpoint information for any resource for which endpoint discovery has already been performed. Maintaining the cache 308 may reduce the number calls made by the workflow discovery engine 114 to the container orchestration API 116.

Figure 4:
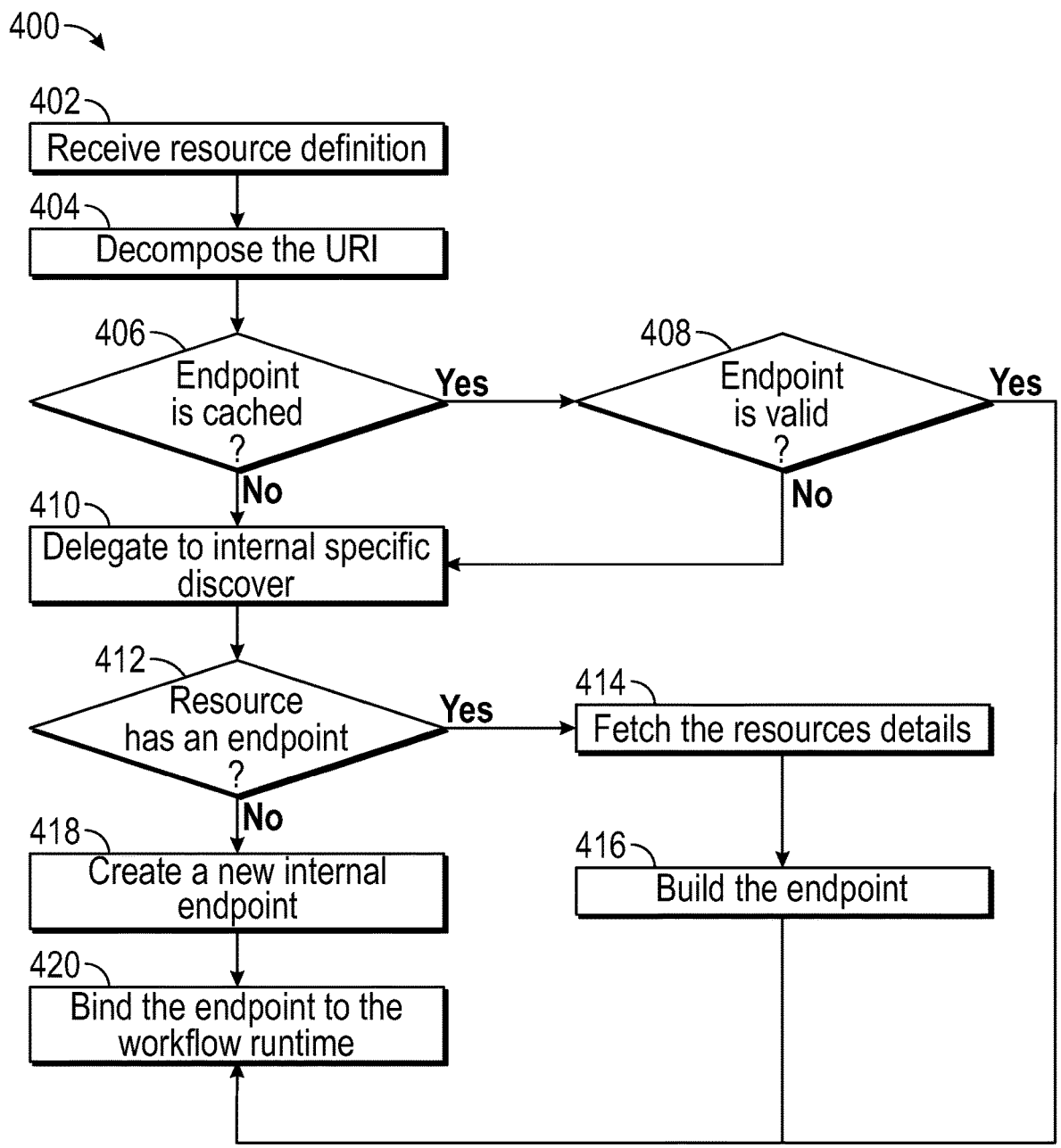
FIG. 4 is a process flow diagram for a method of performing endpoint discovery, in accordance with some embodiments.

FIG. 4 is a process flow diagram for a method of performing endpoint discovery, in accordance with some embodiments. The method 400 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by the workflow discovery engine 114 as described with respect to FIGS. 1 and 3. The method may begin at block 402.

At block 402, a resource identifier is received by the workflow discovery engine 114. The resource identifier may be in the form of a URI such as the URI shown in FIG. 2.

At block 404, the URI is decomposed. Specifically, the URI is parsed to extract the resource information such as group, version, kind, namespace, name, and possibly other attributes.

At block 406, a determination is made regarding whether the relevant endpoint is cached. This indicates that the discovery process was previously performed and the endpoint information is stored to memory. If the endpoint is cached, the process flow advance to block 408 where it is determined whether the endpoint is still valid. If the endpoint is still valid, the process flow advance to block 420 and the endpoint is bound to the workflow runtime. If the endpoint is not cached or no longer valid, the process flow advances to block 410.

At block 410, the resource identifier is delegated to the internal endpoint discovery process, which is performed through calls from workflow discovery engine to the container orchestration API.

At block 412, the workflow discovery engine sends a query to the container orchestration API of the container orchestration system to determine whether the resource currently has an endpoint. The query to the container orchestration API can include the group, version, and kind, name, and namespace of the resource object. The query process may vary depending on the URI subset involved. For example, a URI for a deployment resource of the form: "kubernetes:apps/v1/deployment/default/my-nginx" would make a specific call to the deployment API using the "default" namespace and the resource name "my-nginx" as the query parameters. If the endpoint is found, the process flow advances to block 414.

At block 414, the workflow discovery engine fetches the resource's endpoint details depending on the results of the query performed at block 412. Following the above example from block 412, the deployment object returned by the query has a data structure that can be used to find the other objects associated to with the deployment object. From there, the workflow discovery engine will fetch the deployment bound objects through additional queries to the container orchestration API to find the actual endpoint details.

At block 416, the workflow discovery engine builds the endpoint using the information received from the container orchestration API. The workflow discovery engine has received a data structure representing the objects fetched to discover the endpoint plus the resolved URI as shown above. Using the same example from above, an example data structure built for the endpoint information may take the form "Deployment [name: my-nginx]; Service [name: my-nginx]; Endpoint [URL: http://my-nginx:80]". The process flow then advances to block 420 and the endpoint is bound to the workflow runtime by associating the endpoint information with the correct workflow state.

If, at block 412, the endpoint is not found, the process flow advances to block 418. Not finding the endpoint means that the container orchestration API has no information about the resource and that the specific resource has not been created.

At block 418, a new internal endpoint is created. Specifically, the workflow discovery engine can send a command to the container orchestration API to instantiate the resource object described by the resource identifier. The endpoint details for the newly created resource may be assigned by the container orchestration API and sent from the container orchestration API to the workflow discovery engine as part of an acknowledgement that the resource has been created. For example, if the URI describes a deployment resource named "my-nginx", the workflow discovery engine will command the container orchestration API to create a service attached to the deployment, and then retrieve the endpoint created by the cluster and held by the service object.

The process flow then advances to block 420 and the endpoint is bound to the workflow runtime by associating the endpoint information with the correct workflow state.

It will be appreciated that embodiments of the method 400 may include additional blocks not shown in FIG. 4 and that some of the blocks shown in FIG. 4 may be omitted. Additionally, the processes associated with blocks 402 through 420 may be performed in a different order than what is shown in FIG. 4.

Figure 5:
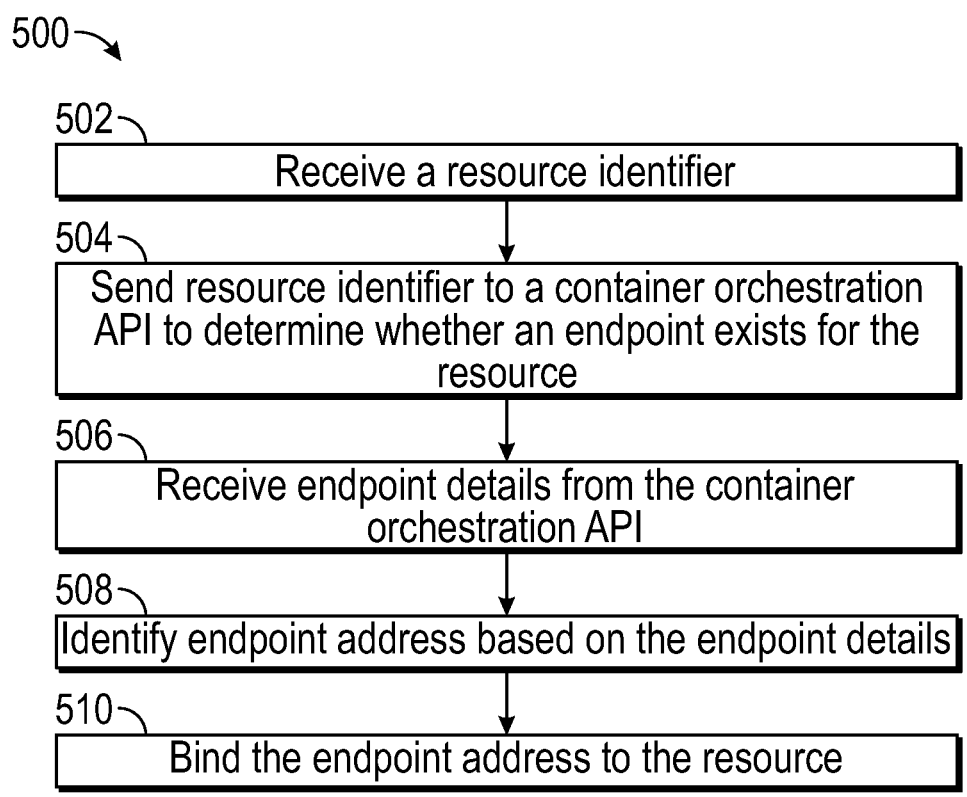
FIG. 5 is a process flow diagram summarizing a method of performing endpoint discovery, in accordance with some embodiments.

FIG. 5 is a process flow diagram summarizing a method of performing endpoint discovery, in accordance with some embodiments. The method 500 may be performed by processing logic that may include hardware, software, firmware, or a combination thereof. In some embodiments, the method 500 may be performed by the workflow discovery engine 114 as described with respect to FIGS. 1 and 3.

The method 500 illustrates example functions used by various embodiments. Although specific function blocks are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed. The method 500 may begin at block 502.

At block 502, a resource identifier is received by a processing device. The resource identifier describes a resource of a computing cluster to be accessed by a workflow application and may be in the form of a URI.

At block 504, the resource identifier is sent to a container orchestration API to determine whether an endpoint exists for the resource. The container orchestration API may be a Kubernetes API for example.

Blocks 506, 508, and 510 are performed in response to an indication from the container orchestration API that the endpoint exists. At block 506, endpoint details used to access the resource are received from the container orchestration API. At block 508, an endpoint address is identified based on the endpoint details. For example, the endpoint address may be a URL. At block 510, the endpoint address is bound to the resource in a runtime version of the workflow application to enable the workflow application to access the resource.

It will be appreciated that embodiments of the method 500 may include additional blocks not shown in FIG. 5 and that some of the blocks shown in FIG. 5 may be omitted. Additionally, the processes associated with blocks 502 through 506 may be performed in a different order than what is shown in FIG. 5.

Figure 6:
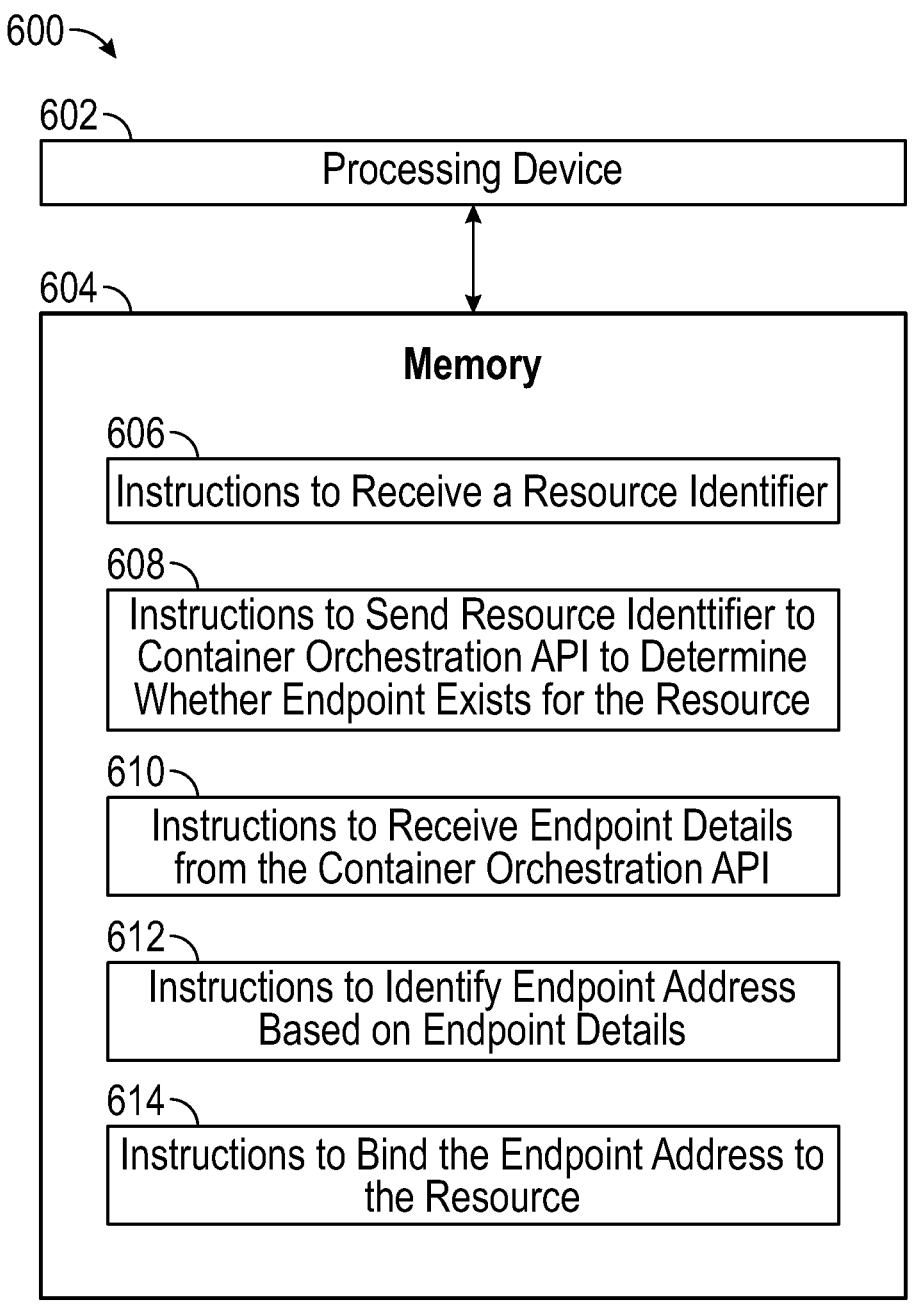
FIG. 6 is a block diagram of a system for performing endpoint discovery, in accordance with some embodiments.

FIG. 6 is a block diagram of a system for performing endpoint discovery, in accordance with some embodiments. The system 600 includes a processing device 602 operatively coupled to a memory 604. The memory 604 includes instructions that are executable by the processing device 602 to cause the processing device 602 to perform endpoint discovery.

The memory 604 includes instructions to receive a resource identifier 606. The resource identifier describes a resource of a computing cluster to be accessed by a workflow application and may be in the form of a URI.

The memory 604 also includes instructions to send the resource identifier to a container orchestration API to determine whether an endpoint exists for the resource 608. The container orchestration API may be a Kubernetes API for example.

The memory 604 also includes instructions to 610, 612, and 614, which are performed in response to an indication from the container orchestration API that the endpoint exists. The instructions 610 are to receive the endpoint details from the container orchestration API. The instructions 612 are to identify an endpoint address based on the endpoint details. For example, the endpoint address may be a URL. The instructions 614 are to bind the endpoint address to the resource in a runtime version of the workflow application to enable the workflow application to access the resource.

It will be appreciated that various alterations may be made to the process illustrated in FIG. 6 and that some components and processes may be omitted or added without departing from the scope of the disclosure.

Figure 7:
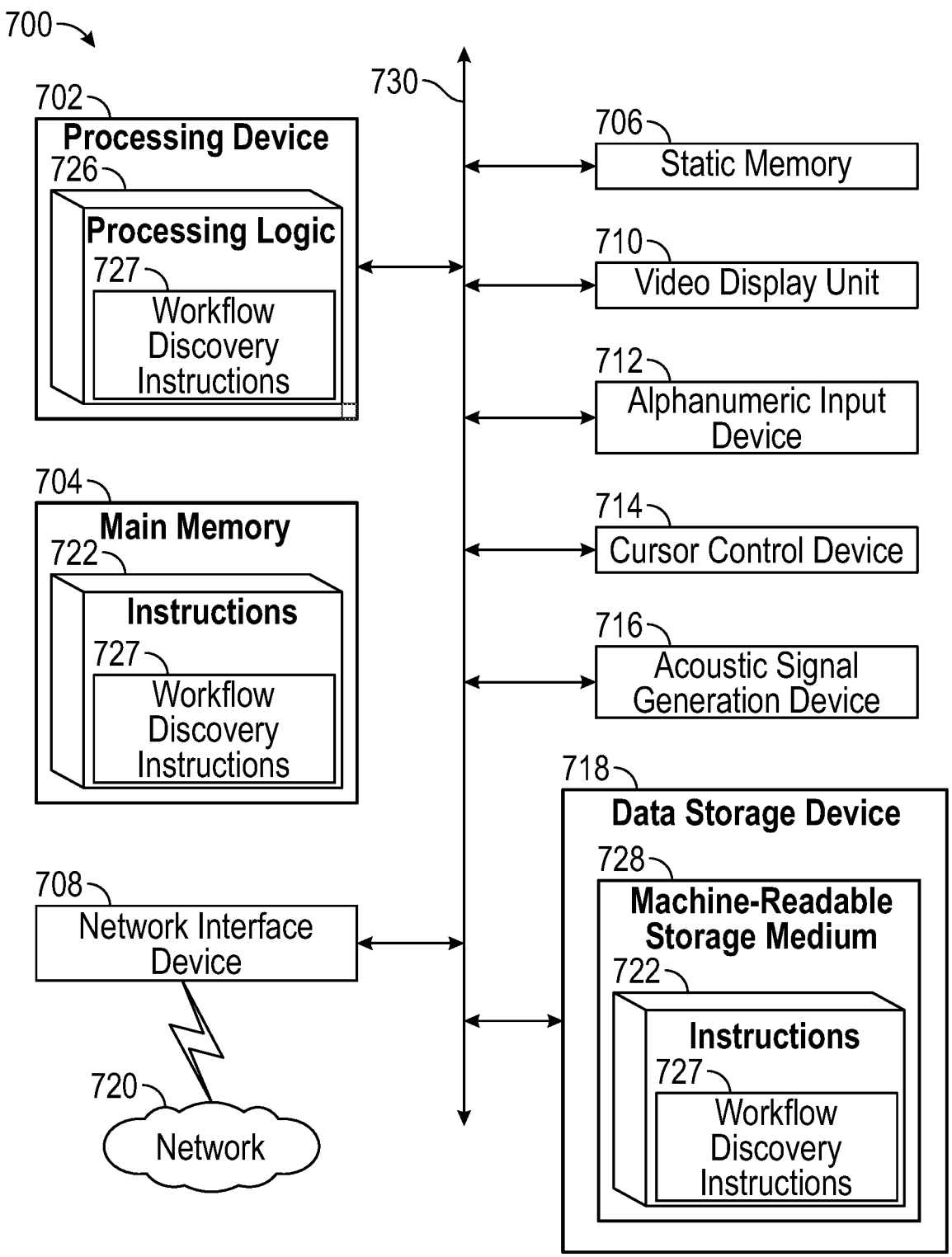
FIG. 7 is a block diagram of an example computing device that may perform one or more of the operations described herein, in accordance with some embodiments.

FIG. 7 is a block diagram of an example computing device 700 that may perform one or more of the operations described herein, in accordance with some embodiments. Computing device 700 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 700 may include a processing device (e.g., a general purpose processor, a PLD, etc.) 702, a main memory 704 (e.g., synchronous dynamic random access memory (DRAM), read-only memory (ROM)), a static memory 706 (e.g., flash memory and a data storage device 718), which may communicate with each other via a bus 730.

Processing device 702 may be provided by one or more general-purpose processing devices such as a microprocessor, central processing unit, or the like. In an illustrative example, processing device 702 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 702 may also comprise one or more special-purpose processing devices such as an application specific integrated circuit (ASIC), a field programmable gate array (FPGA), a digital signal processor (DSP), network processor, or the like. The processing device 702 may be configured to execute the operations described herein, in accordance with one or more aspects of the present disclosure, for performing the operations and steps discussed herein.

Computing device 700 may further include a network interface device 708 which may communicate with a network 720. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and an acoustic signal generation device 716 (e.g., a speaker). In one embodiment, video display unit 710, alphanumeric input device 712, and cursor control device 714 may be combined into a single component or device (e.g., an LCD touch screen).

Data storage device 718 may include a computer-readable storage medium 728 on which may be stored one or more sets of instructions 722 that may include workflow discovery instructions 727 for carrying out the operations described herein, in accordance with one or more aspects of the present disclosure. Workflow discovery instructions 727 may also reside, completely or at least partially, within main memory 704 and/or within processing device 702 (e.g. within processing logic 726) during execution thereof by computing device 700, main memory 704 and processing device 702 also constituting computer-readable media. The workflow discovery instructions 727 may further be transmitted or received over a network 720 via network interface device 708.

While computer-readable storage medium 728 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
  receiving a resource identifier describing a resource of a computing cluster to be accessed by a workflow application;
  sending, by a processing device, the resource identifier to a container orchestration application programming interface (API) to determine whether an endpoint exists for the resource; and
  in response to an indication from the container orchestration API that the endpoint exists:
    receiving, from the container orchestration API, endpoint details used to access the resource;
    identifying an endpoint address based on the endpoint details; and binding the endpoint address to the resource in a runtime version of the workflow application to enable the workflow application to access the resource.

2. The method of claim 1, wherein the runtime version of the workflow application invokes the resource by issuing a call to the resource via the endpoint address.

3. The method of claim 1, wherein the resource identifier comprises a group, version, kind, name, and namespace describing the resource.

4. The method of claim 1, wherein the resource identifier is in the form of a uniform resource identifier (URI).

5. The method of claim 1, wherein the resource is a Kubernetes microservice.

6. The method of claim 1, comprising:
receiving a second resource identifier describing a second resource of the computing cluster to be accessed by the workflow application;
in response to an indication from the container orchestration API that the endpoint does not exist:
commanding the container orchestration API to instantiate the second resource and assign endpoint details to be used to access the second resource.

7. The method of claim 6, comprising:
identifying a second endpoint URL for the second resource; and
binding the second endpoint URL to the runtime version of the workflow application.

8. A computing system comprising:
a memory; and
a processing device operatively coupled to the memory, the processing device to:
receive a resource identifier describing a resource of a computing cluster to be accessed by a workflow application;
send the resource identifier to a container orchestration application programming interface (API) to determine whether an endpoint exists for the resource; and
in response to an indication from the container orchestration API that the endpoint exists:
receive, from the container orchestration API, endpoint details used to access the resource;
identify an endpoint address based on the endpoint details; and
bind the endpoint address to the resource in a runtime version of the workflow application to enable the workflow application to access the resource.

9. The computing system of claim 8, wherein the runtime version of the workflow application invokes the resource by issuing a call to the resource via the endpoint address.

10. The computing system of claim 8, wherein the resource identifier comprises a group, version, kind, name, and namespace describing the resource.

11. The computing system of claim 8, wherein the resource identifier is in the form of a uniform resource identifier (URI).

12. The computing system of claim 8, wherein the resource is a Kubernetes microservice.

13. The computing system of claim 8, wherein the processing device is further to:
receive a second resource identifier describing a second resource of the computing cluster to be accessed by the workflow application;
in response to an indication from the container orchestration API that the endpoint does not exist:
command the container orchestration API to instantiate the second resource and assign endpoint details to be used to access the second resource.

14. The computing system of claim 13, wherein the processing device is further to:
identify a second endpoint URL for the second resource; and
bind the second endpoint URL to the runtime version of the workflow application.

15. A non-transitory computer-readable storage medium including instructions that, when executed by a processing device, cause the processing device to:
receive a resource identifier describing a resource of a computing cluster to be accessed by a workflow application;
send, by the processing device, the resource identifier to a container orchestration application programming interface (API) to determine whether an endpoint exists for the resource; and
in response to an indication from the container orchestration API that the endpoint exists:
receive, from the container orchestration API, endpoint details used to access the resource;
identify an endpoint address based on the endpoint details; and
bind the endpoint address to the resource in a runtime version of the workflow application to enable the workflow application to access the resource.

16. The non-transitory computer-readable storage medium of claim 15, wherein the runtime version of the workflow application invokes the resource by issuing a call to the resource via the endpoint address.

17. The non-transitory computer-readable storage medium of claim 15, wherein resource identifier comprises a group, version, kind, name, and namespace describing the resource.

18. The non-transitory computer-readable storage medium of claim 15, wherein the resource identifier is in the form of a uniform resource identifier (URI).

19. The non-transitory computer-readable storage medium of claim 15, further comprising instructions that cause the processing device to:
receive a second resource identifier describing a second resource of the computing cluster to be accessed by the workflow application;
in response to an indication from the container orchestration API that the endpoint does not exist:
command the container orchestration API to instantiate the second resource and assign endpoint details to be used to access the second resource.

20. The non-transitory computer-readable storage medium of claim 15, further comprising instructions that cause the processing device to:
identify a second endpoint URL for the second resource; and
bind the second endpoint URL to the runtime version of the workflow application.

* * * * *